July 13, 1954
J. R. CONRATH
POWER TRANSMISSION
Filed Nov. 29, 1951
2,683,854
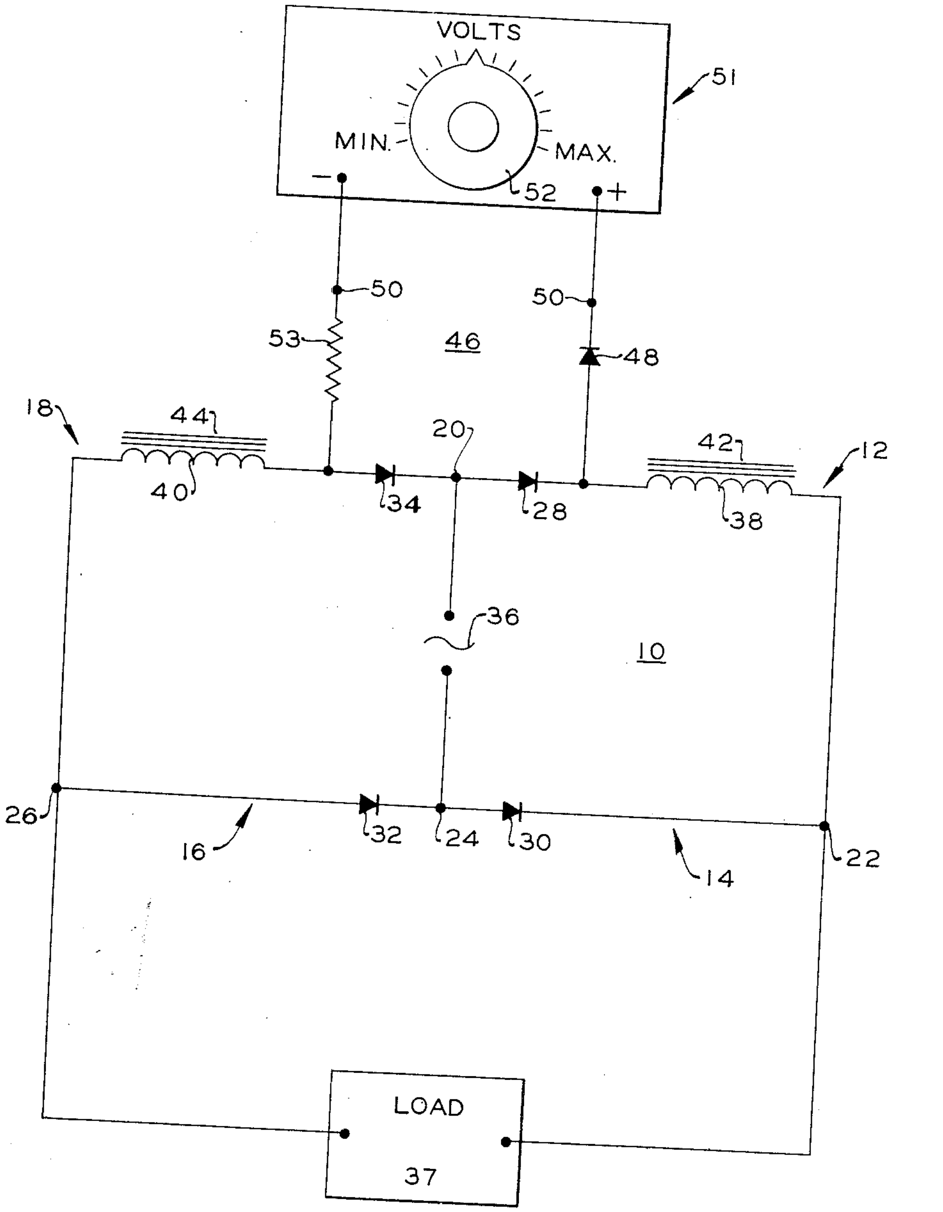
INVENTOR.
JULES R. CONRATH
BY Ralph L. Tweedale
ATTORNEY Patented July 13, 1954

2,683,854

UNITED STATES PATENT OFFICE 2,683,854

POWER TRANSMISSION

Jules E. Conrath, St. Louis, Mo., assignor to Vickers Incorporated, Detroit, Mich., a corporation of Michigan Application November 29, 1951, Serial No. 258,786

24 Claims. (Cl. 321—25)

This invention relates to power transmission, and more particularly to magnetic amplifier control.

Generally saturable reactors utilized in magnetic amplifiers employ saturation control windings on the same core as the main reactance winding. Although there are many magnetic amplifier applications where a fast control response is desirable, it is well known that control windings have inductance and by their very nature tend to introduce time delays in the control circuit, thus increasing response time. Also since both main and control windings are carried by the same core and are usually wound through the same core windows, the core and window space must be enlarged beyond the size required for only the main reactance winding for any given power requirement. A reduction in core size for any given power requirement would always be welcome from space and economic standpoint. In accordance with the present invention magnetic amplifier control is effected without a control winding, thus providing speedier response and smaller core size.

Among other things the invention herein embraces control of self-saturating magnetic amplifiers by employing a bucking control voltage to oppose a desaturating or demagnetizing current derived from the alternating potential applied to the power input and supplied to the reactance winding during the non-conducting or inactive period of a half-wave rectifier in series with the reactance winding of a self-saturating reactor circuit.

It is therefore an object of this invention to provide a new and useful magnetic amplifier.

Another object is to provide a magnetic amplifier circuit with an improved control response time.

Another object is to provide a new and useful control circuit for self-saturating reactor circuits.

Another object is to provide a magnetic amplifier employing a smaller than usual core size for a given power need.

A further object of the invention is a saturable-core reactor circuit wherein saturation may be controlled without a control coil.

Further objects and advantages of the present invention will be apparent from the following description, reference being had to the accompanying single figure drawing wherein a diagram of a preferred form of the present invention is clearly shown.

The circuit illustrated is a self-saturating, full wave output, bridge type magnetic amplifier.

The term "self-saturating magnetic amplifier" has an accepted meaning in the art and refers to a circuit in which the reactance or output winding of a saturable-core reactor is always in series with a switching device having cyclic active and inactive periods, the device being conductive during the active periods and less conductive or nonconductive during the inactive periods, for example, a half-wave rectifier, which switching device neglecting leakage if any, allows periodic, unidirectional, current pulses to flow in the reactance winding during the conductive or active periods of the switching device thereby resulting in the reactor having D. C. premagnetization during the inactive periods of the switching device. Magnetic saturation resulting from D. C. premagnetization obtained as a result of intermittent, unidirectional, current pulses passing through the reactance winding is known as self-saturation. In the ideal and otherwise uninfluenced circuit, this premagnetization is the point of residual magnetism of one polarity. Hereinafter, current flowing through the reactance winding in the direction which provides or aids the premagnetization will be referred to as saturating current, and the direction of such flow shall be referred to as the saturating direction. On the other hand, current which flows through the reactance winding in a direction to oppose the premagnetization will be referred to as desaturating current; and its flow direction, the desaturating direction.

In the diagram, the bridge 10 has four brances 12, 14, 16, and 18, connected at conjugate points 20, 22, 24 and 26, the points 20 and 24 constituting the power input circuit of the bridge, and the points 22 and 26 being the output circuit of the bridge. Each branch has connected therein a half wave rectifier, for example a selenium rectifier, as indicated at 28, 30, 32, and 34, so oriented that when alternating voltage from a source 36 is applied to the power input 20—24, a rectified full wave current will flow through a load 37 connected to the output circuit 22—26 of the bridge. Rectifiers 28 and 34 are oppositely related to each other with respect to point 20, which is a common junction for branches 12 and 18. Because of the reversely related rectifiers in branches 12 and 18 these branches transmit power from the power input circuit to the output circuit on opposite half-waves of the alternating voltage supplied to the power input. That is, these branches alternately transmit current between the input and output circuits. Also because of their reverse relation, rectifiers 28 and 34 pass half-wave current through the branches 12 and 18 in opposite directions with respect to the input terminal 20. Branches 12 and 18 also have connected therein reactance windings 38 and 40, respectively, wound on saturable magnetic cores 42 and 44, the winding 38 being in series with the rectifier 28, and the winding 40 being serially connected with rectifier 34. The branches 12 and 18 are self-saturating reactor circuits because the windings therein are connected in series with half-wave rectifiers which furnish half-wave current to their series associated windings.

The output of the amplifier is controlled by the impedances in the branches 12 and 18, which are determined by controlling the magnetic saturation in the reactors. Magnetic saturation may be controlled by changing the core premagnetization. This is accomplished in each of branches 12 and 18 by providing a path through which desaturating current derived from the power input circuit can flow through the reactance winding during the non-conducting or inactive portion of the rectifying cycle in that branch, and controlling the value of the desaturating current by interposing in its path an oppositely sensed signal voltage. The direction of desaturating current through the reactance winding is necessarily opposite to that of current flow during the conductive half of the rectifying cycle, and its effect is to reduce the level of D. C. premagnetization in the reactor core during the inactive period of the rectifying cycle and thereby increase the impedance of the winding, thus to reduce the output of the reactor. The result of inserting an oppositely poled voltage in the path of the desaturating current is to reduce the effect of the desaturating current, thereby decreasing the reactance of the winding and increasing the reactor output. The higher the signal voltage, the greater is the opposition to the voltage producing the desaturating current, and accordingly the greater is the reactor output. Conversely, as the signal voltage is reduced and approaches zero, the reactor output will decrease and approach cut-off or minimum output of the particular circuit. Thus the reactor load current is substantially proportional to the signal voltage.

In the embodiment illustrated, this control is effected by a control circuit 46 which, with respect to current from the power input circuit, shunts the rectifier 28 on one half cycle of the alternating voltage applied to the input circuit, and rectifier 34 on the other half cycle. The control path with desaturating current by-passes the rectifiers 28 and 34 during their respective inactive periods. The control circuit includes signal input terminals 50 for receiving a signal from a signal voltage source 51, such as a battery, generator, or any other suitable signal source. The signal source is provided with a control 52 for adjusting the voltage output thereof. In the case of a generator either the field or the speed may be varied to adjust the voltage output, while in the case of a battery a voltage divider or individual cell taps can be employed to control the voltage output. The control 52 represents any type of voltage control employed. The signal voltage is applied to the signal input with its polarity opposed to that of desaturating current, and in the same sense as the potential at the rectifiers 28 and 34 when they are conducting. If desired, a resistance 53 may be inserted in the control circuit 46 to provide a limiting bias for the desaturating current. A unidirectional device 48, for example a half-wave rectifier, is connected in the control circuit 46 in series with the signal input terminals 50 to block current drain from any signal source connected to the signal input terminals, and to prevent the flow of current through the control circuit 46 in the saturating direction of the reactance windings. With respect to any one winding, the rectifier 48 is oppositely related to the rectifier associated with that winding. Thus, rectifier 48 is oppositely related to rectifier 28 with respect to winding 38 and oppositely related to rectifier 34 with respect to winding 40.

Operation of the amplifier shown is conveniently analyzed by separately following the effect of each half cycle of alternating voltage applied to the power input circuit 20—24. For explanatory purposes it is arbitrarily assumed herein that each of the rectifiers conducts current in the direction of the arrowhead part of the rectifier symbol, the arrowhead itself being symbolic of one of the electrodes of a rectifier, and that such conduction takes place when that electrode is at a positive potential.

When the alternating voltage applied to the power input circuit is positive at the point 20, half wave current will tend to flow through rectifier 28, winding 38, into the output circuit 22, thence through the load, to the output circuit to point 26, and to the power input circuit point 24 through rectifier 32. During this half cycle rectifier 34 blocks current flow from the point 20. Therefore, this is the non-conducting or inactive period of the rectifying cycle of rectifier 34. However, while point 20 is positive (inactive half cycle of rectifier 34), the control circuit 46 forms a path by-passing rectifier 34, through which path half wave current will tend to flow from the power input circuit at 20 through rectifier 28, rectifier 48, and signal source 51, to the winding 40, and returning by way of point 26 and rectifier 32 to the other side 24 of the power input circuit. This current flow with respect to winding 40 is in a demagnetizing direction and operates to reduce the level of D. C. premagnetization in the core 44, thereby increasing the reactance of the winding 40. As hereinbefore noted, this current is called desaturating current.

Since the polarity of the control signal from the source 51 is opposed to the polarity of the desaturating current in the control path, the value of the desaturating current that will flow will be determined by the difference in the opposing potentials. The flow of desaturating current through the control circuit path and the winding 40 is therefore controlled by adjusting the magnitude of the bucking voltage from the signal source 51 introduced in the control circuit 46.

On the next half cycle of the alternating voltage applied to the input circuit, that is, when point 24 is positive, rectifiers 28 and 32 are inactive, while rectifiers 34 and 30 are conductive and allow half wave current flow through the winding 40 into the output circuit and the load. During this nonconducting period of rectifier 28, the control circuit 46 provides a path, by-passing rectifier 28, for allowing desaturating current, derived from the alternating potential applied to the power input circuit, to flow through winding 38. The path for this current may be traced from the power input point 24 through rectifier 30, winding 38, rectifier 48, the bucking voltage source 51, and thence through rectifier 34 to the other point 20 of the power input circuit. Again it will be seen that the polarity of the signal source 51 is opposed to the flow of desaturating current through the inactive winding, and the value of desaturating current is controlled by adjusting the bucking voltage from the signal source. Thus the control circuit provides a path for inserting a bucking voltage into the path of desaturating current during the inactive load current periods of both reactors, each respectively occurring on opposite halves of the applied alternating voltage cycle. From the foregoing it is apparent that during the inactive period of rectifier 34, the control circuit forms a path effectively in series with the winding 40, and effectively shunted around rectifier 34, while on the next half cycle or inactive period of rectifier 28, the control circuit forms a path effectively in series with winding 38 and effectively shunted around rectifier 28.

The present invention provides a magnetic amplifier with an extremely fast response time; at least within a half cycle of the alternating voltage supply. The present invention permits saturation control without a control winding, thus allowing more core window area for the reactance or output winding of the reactor and permitting greater power output for a given core size. No power is drawn from the signal source in opposing the flow of desaturating current through the control circuit.

The disclosure of a bridge type self-saturating magnetic amplifier is by way of example only, and the invention may be used in connection with any magnetic amplifier employing the self-saturating principle. Although the invention eliminates the need for a control winding, control windings may be employed for supplemental control if desired.

While the form of embodiment of the invention as herein disclosed constitutes a preferred form, it is to be understood that other forms might be adopted, all coming within the scope of the claims which follow.

What is claimed is as follows:

1. A magnetic amplifier comprising power input and output circuits and means for controlling the flow of power between the input and output circuits, said means comprising a reactor with a saturable core and a reactance winding on the core, means for controlling the impedance of said winding by affecting the magnetization of said core, said last means comprising means for passing intermittent unidirectional current pulses through said winding in a particular direction, a path for passing current through said winding in the opposite direction, means for applying a bucking voltage to said path to oppose passage of the latter current through said winding, and means for blocking current flow in said path in said first direction.

2. A magnetic amplifier comprising a reactor with a saturable core and a reactance winding on the core, and means for controlling the impedance of said winding by affecting the magnetization of said core, said last means comprising a rectifier connected in series with said winding for passing half-wave unidirectional current through said winding, a path connected to said winding for passing desaturating current through said winding, means for interposing in said path a signal oppositely sensed with respect to said desaturating current to reduce the flow of desaturating current, and means for preventing current flow in said path in the saturating direction of said winding.

3. A magnetic amplifier comprising a reactor with a saturable core and a reactance winding on the core, and means for controlling the impedance of said winding by affecting the magnetization of said core, said last means comprising a rectifier connected in series with said winding for passing intermittent unidirectional current pulses through said winding, a path connected to said winding for passing desaturating current through said winding, and means for inserting a bucking voltage in said path for reducing the flow of desaturating current.

4. A magnetic amplifier comprising a reactor with a saturable core and a reactance winding on the core, and means for controlling the impedance of said winding by affecting the magnetization of said core, said last means comprising a rectifier connected in series with said winding for passing half-wave unidirectional current through said winding, a path connected to said winding for passing desaturating current through said winding, means for substantially preventing current flow in said path in the direction of saturating current, means for inserting a bucking voltage in said path for opposing the flow of desaturating current.

5. A magnetic amplifier comprising a reactor with a saturable core and a reactance winding on the core, and means for controlling the impedance of said winding by affecting the magnetization of said core, said last means comprising a rectifier connected in series with said winding for passing intermittent unidirectional current pulses through said winding, a path connected to said winding for passing desaturating current through said winding, a unidirectional device in said path oppositely related to said rectifier with respect to the winding, means for inserting a bucking voltage in said path to oppose the flow of said desaturating current.

6. A magnetic amplifier comprising a reactor with a saturable core and a reactance winding, a rectifier connected in a circuit with said winding for passing intermittent current through said winding in the conducting direction of the rectifier when an alternating voltage is applied to said circuit, a control circuit for passing current derived from said alternating voltage through said winding in a desaturating direction, means for interposing a bucking voltage in said control circuit to oppose the passage of said derived current through said winding.

7. A magnetic amplifier comprising a reactor with a saturable core and a reactance winding, a rectifier connected in a circuit with said winding for passing intermittent current through said winding in the conducting direction of the rectifier when an alternating voltage is applied to said circuit, a control circuit for passing current derived from said alternating current through said winding in a desaturating direction, means for interposing a bucking voltage in said control circuit to oppose the passage of said derived current through said winding, and a unidirectional device in the control circuit oppositely related to the first rectifier.

8. A magnetic amplifier comprising a saturable-core reactor and a half wave rectifier connected to form a self-saturating reactor circuit, a control circuit connected to said reactor circuit and bypassing said rectifier, said control circuit comprising a unidirectional device in series with a signal voltage source, said rectifier and said unidirectional device being oppositely related and said source being adapted to supply a voltage in opposite sense to the conducting direction of said unidirectional device.

9. A magnetic amplifier comprising a power input circuit, an output circuit, an intermediate circuit for transmitting power between the input and output circuits and including a saturable-core reactor with a reactance winding and a rectifier connected in series with the winding for passing half-wave unidirectional current through said winding when an alternating potential is applied to the input circuit, a control circuit for passing desaturating current derived from said input circuit through said winding, said control circuit comprising a desaturating current path effectively in series with said winding and effectively in shunt with said rectifier during the inactive periods of the rectifier and means for inserting a bucking voltage in the control circuit for opposing voltages producing desaturating current.

10. A magnetic amplifier comprising a power input ciruit, an output circuit, an intermediate circuit for transmitting power between the input and output circuits and including a saturable-core reactor with a reactance winding and a rectifier connected in series with the winding for passing half-wave unidirectional current through said winding when an alternating potential is applied to the input circuit, a control circuit for passing desaturating current derived from said input circuit through said winding, said control circuit comprising a desaturating current path effectively in series with said winding and effectively in shunt with said rectifier during the inactive periods of the rectifier, means for inserting a signal voltage in the control circuit in opposite sense to desaturating current, and means for preventing the flow of current in the control circuit in the saturating direction of said winding.

11. A magnetic amplifier comprising a power input circuit, an output circuit, an intermediate circuit for transmitting power between the input and output circuits and including a saturable-core reactor with a reactance winding and a rectifier connected in series with the winding for passing half-wave unidirectional current through said winding when an alternating potential is applied to the input circuit, a control circuit for passing through said winding desaturating current derived from said alternating potential, said control circuit being effectively in series with said winding and effectively in shunt with said rectifier during the inactive periods of said rectifier, a source of signal voltage inserted in the control circuit in opposite sense to desaturating current, and a unidirectional device in the control circuit oppositely related to said rectifier with respect to said winding.

12. A magnetic amplifier comprising a power input circuit for receiving alternating voltage, an output circuit connectable to a load, an intermediate circuit for transmitting power from the input to the output circuit, said intermediate circuit including a saturable core reactor with a reactance winding and a rectifier connected in series with the winding for passing half-wave unidirectional current through said winding, a control circuit for passing current from said input circuit through said winding in the nonconducting direction of the rectifier, said control circuit having connected therein a unidirectional device oppositely related to said rectifier with respect to said winding, and means for inserting in said control circuit a bucking voltage poled to oppose voltages producing current flow in the conducting direction of said unidirectional device.

13. A magnetic amplifier comprising a power input circuit for receiving alternating voltage, an output circuit for supplying a load, an intermediate circuit for transmitting power from the input to the output circuit, said intermediate circuit including a saturable core reactor with a reactance winding and a rectifier connected in series with the winding for passing half-wave unidirectional current through said winding, a control circuit for passing current from said input circuit through said winding in a desaturating direction, a source of bucking voltage connected into said control circuit for opposing the flow of desaturating current, and means for preventing the control circuit from draining power from said bucking voltage source.

14. A self-saturating reactor circuit comprising a series circuit including a reactance winding and a half wave rectifier for providing half wave current to said winding when said circuit is energized with an alternating potential, a saturable core inductively related to said winding, and a control circuit connected in parallel with a portion of said series circuit, said portion including at least said rectifier but excluding said winding, said control circuit including a unidirectional device in series with a source of control voltage, said rectifier and unidirectional device being oppositely related, and said control voltage source being connected to provide a bucking voltage with respect to the conducting direction of the unidirectional device.

15. A magnetic amplifier comprising a saturable core, a reactance winding carried by said core, a series circuit including said reactance winding and a half-wave rectifier connected to provide half wave current to the winding when alternating voltage is applied to said circuit, a control circuit connected across a portion of said series circuit, said portion including said rectifier and excluding said winding, said control circuit forming a path to said winding along which desaturating current derived from said alternating voltage at least tends to flow during the nonconducting half cycle of said rectifier, and means for inserting a bucking voltage in said path to oppose the flow of said derived current.

16. A magnetic amplifier comprising a power input circuit, an output circuit, a pair of intermediate circuits for alternately transmitting power from the input circuit to the output circuit when an alterating voltage is applied to the input circuit, each intermediate circuit having saturable-core reactor means with a reactance winding and a half wave rectifier connected in series with the winding, said rectifiers being poled to pass half-wave current alternately through the respective windings on opposite halves of the alternating voltage cycle, a control circuit for passing desaturating current derived from said input circuit through each winding when its associated rectifier is inactive, means for inserting in said control circuit a control voltage oppositely sensed with respect to the desaturating current, and means for preventing the flow of current through said control circuit in a saturating direction with respect to said windings.

17. A magnetic amplifier comprising input and output circuits, a saturable reactor with a reactance winding for controlling the flow of power between the input and output circuits, and means for controlling the impedance of said winding comprising means for passing intermittent unidirectional current pulses through said winding in a particular direction, and a unidirectional path for passing current through said winding in the opposite direction.

18. A magnetic amplifier comprising a power input circuit, an output circuit, an intermediate circuit for transmitting power between the input and output circuits, said intermediate circuit including a saturable-core reactor with a reactance winding and a rectifier connected in series with the winding for passing intermittent unidirectional current pulses through said winding in a particular direction when an alternating potential is applied to the input circuit, a control circuit for passing through said winding desaturating current derived from said alternating potential, said control circuit being shunted around said rectifier and in series with said winding, and a unidirectional device in the control circuit oppositely related to said rectifier.

19. A magnetic amplifier comprising a power input circuit, an output circuit, a pair of intermediate circuits for alternately transmitting power from the input circuit to the output circuit when an alternating voltage is applied to the input circuit, each intermediate circuit having saturable-core reactor means with a reactance winding and a half wave rectifier connected in series with the winding, said rectifiers being poled to pass half-wave current alternately through the respective windings on opposite halves of the alternating voltage cycle, a control circuit for passing desaturating current derived from said input circuit through each winding when its associated rectifier is inactive, and means for inserting in said control circuit a control voltage oppositely sensed with respect to the desaturating current.

20. A magnetic amplifier comprising a power input circuit, an output circuit, a pair of intermediate circuits for alternately transmitting power from the input circuit to the output circuit when an alternating voltage is applied to the input circuit, each intermediate circuit having saturable-core reactor means with a reactance winding and a half wave rectifier connected in series with the winding, said rectifiers being poled to pass half-wave current alternately through the respective windings on opposite halves of the alternating voltage cycle, a control circuit for passing desaturating current through each winding when its associated rectifier is inactive, and means for inserting in said control circuit a control voltage oppositely sensed with respect to the desaturating current.

21. A magnetic amplifier comprising a power input circuit, an output circuit, a pair of intermediate circuits for alternately transmitting power from the input circuit to the output circuit when an alternating voltage is applied to the input circuit, each intermediate circuit having saturable-core reactor means with a reactance winding and a half wave rectifier connected in series with the winding, said rectifiers being poled to pass half-wave current alternately through the respective windings on opposite halves of the alternating voltage cycle, a control circuit for passing desaturating current through each winding when its associated rectifier is inactive, means for inserting in said control circuit a control voltage oppositely sensed with respect to the desaturating current, and means in said control circuit for preventing the flow of current in a saturating direction with respect to said windings.

22. A magnetic amplifier comprising power input and output circuits, a reactor with a saturable core and a reactance winding on said core for controlling the flow of power between the input and output circuits, means for controlling the impedance of said winding by affecting the magnetization of said core, said means comprising means for passing intermittent unidirectional current pulses through said winding to provide premagnetization, means including a path connected to said winding for passing current through said winding in the opposite direction, and means for applying a bucking voltage to said path to oppose passage of the latter current through said winding.

23. A magnetic amplifier comprising a power input circuit, an output circuit, a pair of intermediate circuits for alternately transmitting power from the input circuit to the output circuit when an alternating voltage is applied to the input circuit, each intermediate circuit having saturable-core reactor means with a reactance winding and a half-wave rectifier connected in series with the winding, said rectifiers being poled to pass half-wave rectified current alternately through the respective windings on opposite halves of the alternating voltage cycle, said intermediate circuits having a common junction connected to said input circuit, said rectifiers being oppositely related to each other with respect to said junction, each intermediate circuit having a circuit point between the winding and the rectifier of the circuit, a control circuit connecting said circuit points for passing desaturating current derived from said input circuit through each winding when its associated rectifier is inactive, and a source of control voltage inserted in said control circuit and oppositely sensed to the desaturating current.

24. A magnetic amplifier comprising a power input circuit, an output circuit, a pair of intermediate circuits for alternately transmitting power from the input circuit to the output circuit when an alternating voltage is applied to the input circuit, each intermediate circuit having saturable-core reactor means with a reactance winding and a half-wave rectifier connected in series with the winding, said rectifiers being poled to pass half-wave rectified current alternately through the respective windings on opposite halves of the alternating voltage cycle, said intermediate circuits having a common junction connected to said input circuit, said rectifiers being oppositely related to each other with respect to said junction, each intermediate circuit having a circuit point between the winding and the rectifier of the circuit, a control circuit connecting said circuit points for passing desaturating current derived from said input circuit through each winding when its associated rectifier is inactive, a source of control voltage inserted in said control circuit and oppositely sensed to the desaturating current, and unidirectional means in said control circuit for blocking the flow of current in the control circuit in a saturating direction with respect to said windings, said unidirectional means being oppositely related to said rectifiers with respect to said windings.

References Cited in the file of this patent

UNITED STATES PATENTS

| Number | Name | Date |
|---|---|---|
| 1,977,193 | Logan | Oct. 16, 1934 |
| 1,982,007 | Logan | Nov. 27, 1934 |
| 1,982,329 | Stogoff | Nov. 27, 1934 |
| 2,306,998 | Claesson | Dec. 29, 1942 |
| 2,673,947 | Winther | Mar. 30, 1954 |